US012503245B2

(12) United States Patent
Medici et al.

(10) Patent No.: US 12,503,245 B2
(45) Date of Patent: Dec. 23, 2025

(54) FUSELAGE FOR A CONVERTIBLE AIRCRAFT CAPABLE OF HOVERING

(71) Applicant: LEONARDO S.P.A., Rome (IT)

(72) Inventors: Luca Medici, Samarate (IT); Riccardo Bianco Mengotti, Samarate (IT); Andrea Bavetta, Samarate (IT); Marco Basaglia, Samarate (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/865,800

(22) PCT Filed: Apr. 21, 2023

(86) PCT No.: PCT/IB2023/054080
§ 371 (c)(1),
(2) Date: Nov. 14, 2024

(87) PCT Pub. No.: WO2023/223119
PCT Pub. Date: Nov. 23, 2023

(65) Prior Publication Data
US 2025/0313336 A1    Oct. 9, 2025

(30) Foreign Application Priority Data
May 18, 2022  (EP) .................................... 22174037

(51) Int. Cl.
*B64C 29/00* (2006.01)
*B64C 1/06* (2006.01)
(Continued)

(52) U.S. Cl.
CPC ............ *B64C 29/0016* (2013.01); *B64C 1/06* (2013.01); *B64C 1/14* (2013.01); *B64C 3/10* (2013.01); *B64D 33/08* (2013.01)

(58) Field of Classification Search
CPC ....... B64D 33/08; B64C 29/0016; B64C 1/06; B64C 1/14; B64C 3/10
See application file for complete search history.

(56) References Cited

U.S. PATENT DOCUMENTS 6,464,166 B1   10/2002   Yoeli
6,488,232 B2   12/2002   Moshier
(Continued)

FOREIGN PATENT DOCUMENTS

DE     19647594 A1    4/1997
EP      2604519 A1    6/2013
(Continued)

OTHER PUBLICATIONS

International Search Report and Written Opinion for corresponding PCT Application No. PCT/IB2023/054080 mailed Jun. 12, 2023 (16 pages).

*Primary Examiner* — Tye William Abell
(74) *Attorney, Agent, or Firm* — Leason Ellis LLP (57) ABSTRACT

A fuselage for a convertible aircraft is described, comprising a nose and a tail arranged on mutually opposite sides along a first longitudinal axis of the fuselage; a first portion and a second portion arranged one after the other, proceeding along the first axis from the nose towards the tail; and an electric power source connectable with at least one electric powertrain and arranged inside the second portion; the first and second portion define respectively a first and a second section in a plane orthogonal to the first axis; the second section defines at least one air intake that is open towards the outside of the fuselage itself and fluidically connected with the source so as to convey, in use, a flow of cooling air onto the source itself following the forward motion of the aircraft; the second section having a larger area than the first section; the air intake being arranged at a sidewall of the second (Continued)

portion and externally to the first portion and in a view parallel to the first axis.

14 Claims, 8 Drawing Sheets

(51) Int. Cl.
    *B64C 1/14*           (2006.01)
    *B64C 3/10*           (2006.01)
    *B64D 33/08*        (2006.01)

(56) References Cited

U.S. PATENT DOCUMENTS

| | | |
|---|---|---|
| 6,892,979 B2 | 5/2005 | Milde, Jr. |
| 7,267,300 B2 | 9/2007 | Heath et al. |
| 7,461,811 B2 | 12/2008 | Milde, Jr. |
| 7,472,863 B2 | 1/2009 | Pak |
| 10,577,075 B1 | 3/2020 | Pax et al. |
| 2002/0113165 A1 | 8/2002 | Moshier |
| 2003/0062442 A1* | 4/2003 | Milde, Jr. ............... B64C 3/56 244/12.3 |
| 2003/0080242 A1 | 5/2003 | Kawai |
| 2004/0094662 A1 | 5/2004 | John, Jr. et al. |
| 2006/0226281 A1 | 10/2006 | Walton |
| 2007/0057113 A1 | 3/2007 | Parks |
| 2008/0054121 A1 | 3/2008 | Yoeli |
| 2012/0043413 A1* | 2/2012 | Smith ............... B64C 29/0033 244/12.4 |
| 2018/0305005 A1* | 10/2018 | Parks ............... B64C 39/08 |
| 2019/0127056 A1* | 5/2019 | Weekes ............... B64C 39/12 |
| 2020/0398968 A1 | 12/2020 | Sjostedt et al. |
| 2021/0094374 A1 | 4/2021 | Hirabayashi et al. |
| 2021/0284333 A1 | 9/2021 | Windisch |

FOREIGN PATENT DOCUMENTS

| | | |
|---|---|---|
| KR | 20150020892 A | 2/2015 |
| WO | 2010137016 A2 | 12/2010 |
| WO | 2020105045 A1 | 5/2020 |
| WO | 2021112954 A2 | 6/2021 |

* cited by examiner

FUSELAGE FOR A CONVERTIBLE AIRCRAFT CAPABLE OF HOVERING

CROSS-REFERENCE TO RELATED APPLICATIONS

This Patent Application is a U.S. National Phase Application under 35 U.S.C. § 371 of International Patent Application No. PCT/IB2023/054080, filed on Apr. 21, 2023, which claims priority from European Patent Application No. 22174037.6 filed on May 18, 2022, all of which are incorporated by reference as if expressly set forth in their respective entireties herein.

TECHNICAL FIELD

The present invention relates to a fuselage for an aircraft that is convertible between a first configuration of hovering flight or of flight along a predominantly vertical trajectory and a second forward flight or cruise configuration.

BACKGROUND

In the aviation sector, aeroplanes are normally used for high cruising speeds, in particular greater than 150 knots and high altitudes, e.g. above 30,000 feet. At cruising speeds and high altitudes, aeroplanes use fixed wings to generate the lift necessary to sustain the plane. A sufficient value of this lift can only be obtained by accelerating the aeroplane on runways of considerable length. These runways are also necessary to allow the same aeroplanes to land.

In contrast, helicopters normally have lower cruising speeds than aeroplanes and generate the necessary lift for sustenance through the rotation of the main rotor blades. As a result, helicopters can land/take off without the need for a horizontal speed and using particularly small surfaces. Moreover, helicopters are able to hover and to fly at relatively low altitudes and speeds, resulting thus as particularly manoeuvrable and suitable for demanding manoeuvres such as rescuing people in the mountains or at sea.

Nevertheless, helicopters have inherent limitations in terms of maximum operational altitude, which is around 20000 feet, and maximum operational speed, which cannot exceed 150 knots.

In order to meet the demand for aircrafts that have the same manoeuvrability and flexibility of use as the helicopter and at the same time overcome the inherent limitations mentioned above, convertiplanes are known and which constitute a type of convertible aircraft.

An example of a convertiplane is described in patent application U.S. Pat. No. 10,011,349.

In more detail, the convertiplane described in the aforesaid application essentially comprises:
a fuselage extending along a first longitudinal axis; and
a pair of half-wings projecting cantilevered from respective parts of the fuselage that are opposite to each other, and having respective free ends opposite to the fuselage and aligned along a second transverse axis that is substantially orthogonal to the first longitudinal axis.

The convertiplane further comprises:
a pair of nacelles housing the respective motors; and
a pair of rotors which are rotatable around respective third axes and operatively connected to respective motors.

The rotors are inclinable with respect to the wing around a fourth axis, preferably parallel to the second axis.

The convertiplanes are also able to selectively assume:
a first "helicopter" configuration, wherein the rotors are arranged with the respective third axes that are substantially vertical and orthogonal to the first axis of the convertiplane and orthogonal to the respective motors; or
a second "aeroplane" configuration, wherein the rotors are arranged with respective third axes that are substantially parallel to the first axis of the same convertiplane and coaxial to the respective engines.

Recently, several proposals for convertible aircrafts with electric propulsion have been developed, for example of the type described in patent application WO-A-2020/105045.

There is a perceived need in the sector to realize a convertible aircraft for sports competition or for use in a personal air mobility environment, which exceeds the limits normally set by the certification requirements for aircraft intended for passenger transport.

In greater detail, there is a perceived need to reduce the aerodynamic drag of the fuselage allowing a minimum crew consisting of only two people to be accommodated.

There is a perceived need in the sector to ensure considerable visibility for the crew from the inside towards the outside of the aircraft and, at the same time, to ensure easy access to a cockpit of the aircraft itself.

Finally, there is a perceived need in the sector to realize a convertible aircraft that meets the aforementioned needs, minimising the overall aerodynamic drag of the aircraft itself.

KR-A-20150020892 discloses a fuselage for a convertible aircraft according to the preamble of claim 1.

US-A-2021/284333 discloses an aircraft having a frame assembly that supports a compressor having an outer that defines front and rear nozzle ports with rotatable nozzles for selectable vertical or horizontal thrust. The inner shell and the outer shell define an intake gap therebetween such as an annulus. A first fan unit within the inner shell and is configured to exhaust air through the front nozzle ports. A second fan unit within the outer shell intakes air through the intake gap and exhausts air through the rear nozzle ports. The fan units are preferably connected to one another via a drive shaft that is surrounded by a streamlining tube. The fan units each include a plurality of fans having stators therebetween. The stators have a plurality of stator arms with a wing structure pivotally attached to the trailing edge for angling air flow from a front to a rear fan.

DE-A-19647594 discloses a streamlined cover for paraglider pilots. The cover consists of a frame over which a flexible material is mounted. The front of the cover is streamlined and tapers towards the rear. A support rod for the feet of the pilot forms part of the structure of the cover. The cover is attached to the ropes of the paraglider by means of straps and attachments for the straps which make it possible to adjust the length of the straps. The straps can be adjusted by the pilot during flight, whilst the openings for the arms of the pilot may be continuous through a pretensioned covering.

US-B-10577075 discloses an apparatus for connecting a windscreen and a canopy to an aircraft. The apparatus includes a first frame for securing to the windscreen and a second frame for securing to the canopy. At least one movable joint connects the first frame to the second frame. The at least one movable joint deforms in response to an object striking at least one of the windscreen and the canopy to allow for relative movement between the first and second frames.

US-A-2019/127056 discloses a compound aircraft, which embodies an array of rotors for vertical flight positioned on support booms and wing elements for cruise flight coupled to a central fuselage housing avionics and a pusher propeller for forward propulsion. The aircraft accommodates a cargo-carrying container with mating of the surfaces between container and fuselage and latching mechanisms for attaching and detaching the container and vehicle.

US-A-2021/094374 discloses a land-and-air vehicle configured to switch between a ground traveling mode and an aerial flight mode incudes a body, a wing, a wheel, a suspension, and a lock mechanism. The wing is attached to the body. The wheel is provided on a lower side of the body. The suspension is configured to support the body via the wheel on ground, and to contract due to self-weight of the land-and-air vehicle. The lock mechanism is configured to limit expansion of the suspension from a state in which the suspension has contracted due to the self-weight.

WO-A-2021/112954 discloses a tiltrotor with a range of motion between a forward flight position and a hovering position, where a pylon and the tiltrotor are coupled via a telescoping actuator, a rigid bottom bar, and a fixed hinge that is attached between the rigid bottom bar and the tiltrotor. The tiltrotor moves from the forward flight position to the hovering position includes extending the telescoping actuator so that the tilt rotor rotates about the fixed hinge.

EP-A-2604519 discloses a fixed-wing and electric multi-rotor composite aircraft. The aircraft comprises an electric multi-rotor dynamic system and a main controller, the fixed-wing dynamic system and electric multi-rotor dynamic system are mutually independent structurally, the main controller comprises the fixed-wing control system and an electric multi-rotor control system which is used for controlling the operation of the electric multi-rotor dynamic system, the main controller is also used for controlling the fixed-wing control system and the electric multi-rotor control system to operate independently or synergistically, the rotor rotating plane of the electric multi-rotor dynamic system is parallel to the airframe central shaft. The aircraft is able to shift between two flying modes freely, and takes off, lands and flies like a helicopter as well as a fixed-wing aircraft. A fixed-wing aircraft-helicopter mixed mode can also be used in the take-off, landing and flying process.

US-A-2020/398968 discloses an integrated pultruded composite profiles such as rotor wings and blades for electric vertical take-off and landing aircraft, light helicopters, wind turbines, and rotor other wing applications and integrated design and processing methods for making same are disclosed. US-A-2020/398968 further discloses a plurality of web ribs for stiffening and supporting an outer skin which can comprise fabric plies, a metallic skin, or a thermoplastic composite skin. A process and method to continuously pultrude integrated composite airfoil profile with variable aerodynamic twist is also disclosed. Utilization of a stranded metallic wire rope that enables the leading edge weight to be continuously in-situ fed into the pultrusion process and effectively retained in the pultruded product is also disclosed. Utilization of fiber reinforcement impregnated with matrix resin that is loaded with high density powder for the leading edge weight is also disclosed.

SUMMARY

Aim of the present invention is to realize a fuselage for a convertible aircraft which allows to satisfy at least one of the needs specified above in a simple and economical way.

According to the invention, this aim is achieved by a fuselage for a convertible aircraft as claimed in claim 1.

BRIEF DESCRIPTION OF THE DRAWINGS

For a better understanding of the present invention, three preferred non-limiting embodiments are described, by way of example only and with the aid of the accompanying drawings, wherein.

DESCRIPTION OF EMBODIMENTS

With reference to FIGS. 1 to 11, 1 denotes an aircraft capable of hovering.

In greater detail, the aircraft 1 is selectively switchable between:
- a first configuration (FIGS. 1, 2 and 3), wherein it performs a hovering manoeuvre or moves forward along a predominantly vertical trajectory; and
- a second configuration (FIGS. 8 and 9), wherein it is in a forward flight condition and proceeds along a mainly horizontal trajectory.

It must be specified that in the following present disclosure, expressions such as "above", "below", "at the front", "behind" and the like are used to refer to a normal forward or "hovering" flight condition of the convertiplane 1 shown in FIGS. 1, 2, 3, 8 and 9.

In a known manner, the rotations of the aircraft 1 around the axes Y, X, Z are associated with the following manoeuvres:
- roll, i.e. rotation around the axis Y;
- pitching, i.e. rotation around the axis X;
- yaw, i.e. rotation around the axis Z.

More particularly, the aircraft 1 is intended for sports competitions or for use in a personal air mobility environment.

The aircraft 1 essentially comprises:
- a fuselage 2 which is elongated along the axis Y and defining a nose 4 and a tail 5 of the aircraft 1;

a pair of half-wings 3 extending cantilevered from respective mutually opposite sidewalls 19 of the fuselage 2 and transversely to the axis Y; and a tail portion 6 projecting cantilevered from the tail 5 of the fuselage 2 transversely to the fuselage 2.

With reference to the normal forward flight operating condition, proceeds in a direction oriented from the tail 5 to the nose 4 parallel to the axis Y.

The half-wings 3 are intended to provide a first lift value to the aircraft 1 which is adapted to sustain the aircraft 1 arranged in the second configuration.

The half-wings 3 comprise respective free ends 15 opposite the fuselage 2.

The half-wings 3 extend above the fuselage 2.

The half-wings 3 are divergent from each other proceeding from the fuselage 2 towards the respective free ends 15.

In the case shown, the half-wings 3 comprise:

respective root portions 11 projecting cantilevered from respective sidewalls 19; and respective end portions 12 arranged above the fuselage 2 and defining the respective ends 15 of the half-wings 3 themselves.

The tail portion 6 comprises, in turn, an aerodynamic surface 8 adapted to generate a second lift/downforce value to ensure a desired degree of longitudinal stability to the aircraft 1 itself arranged in the second configuration.

In the case shown, the half-wings 3 have negative deflection and/or negative dihedral angle.

The half-wings 3 are, moreover, without movable aerodynamic surfaces, such as appendages or flaps, in the case shown.

Preferably, the aircraft 1 further comprises a pair of canard-type aerodynamic surfaces 9 projecting cantilevered from respective mutually opposite sides of the nose 4 of the fuselage 2 and adapted to generate a third lift/downforce value to ensure the desired degree of longitudinal stability to the aircraft 1 itself arranged in the second configuration and to support the front propellers.

The aerodynamic surfaces 9 comprise, in turn:

respective root portions 17 projecting cantilevered from and connected to respective sidewalls 19 of the fuselage 2; and respective end portions 18 arranged on the opposite side of the corresponding root portions 17 with respect to the fuselage 2.

Figure 3:
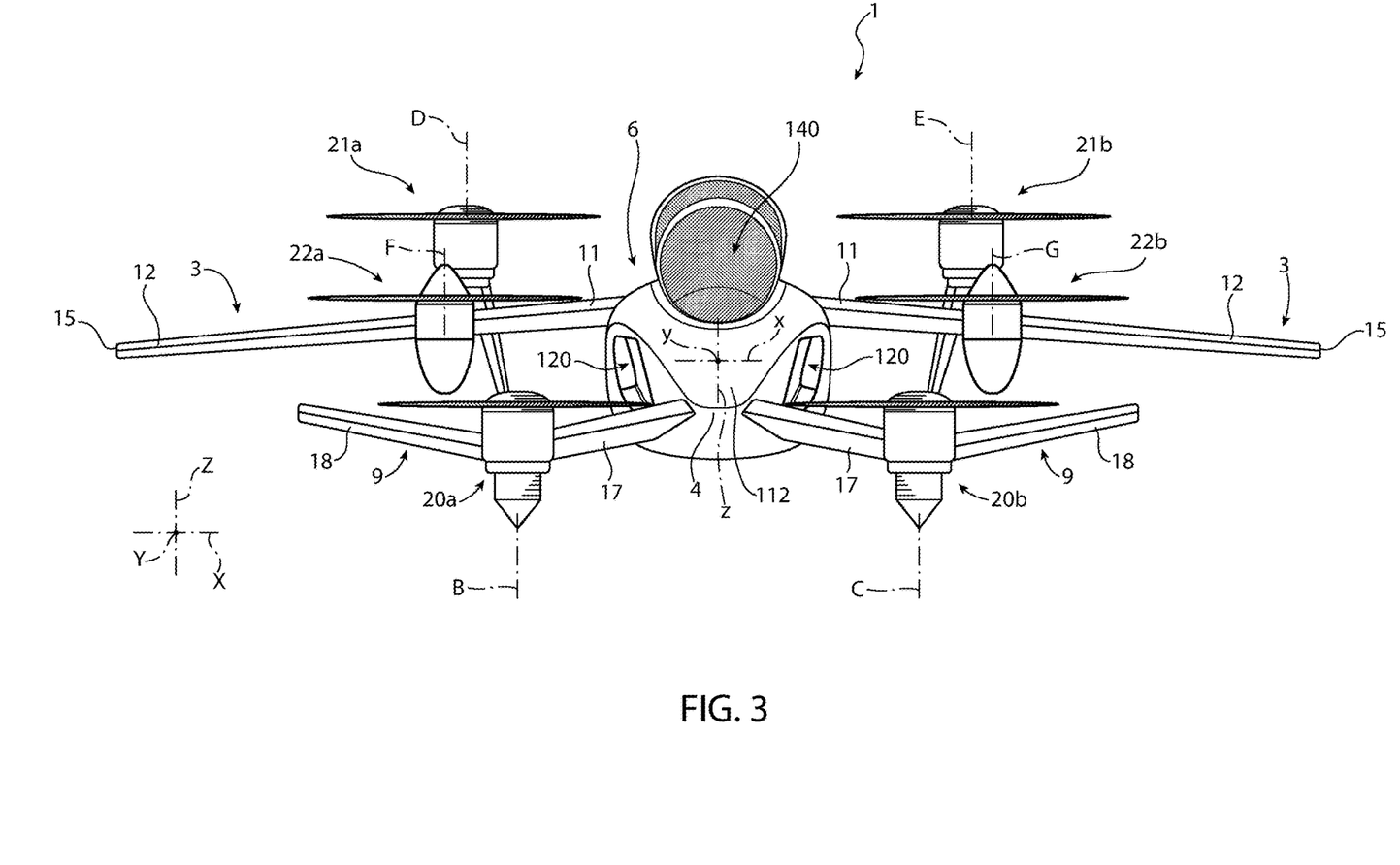
FIG. 3 shows the aircraft of FIG. 1 in a front view.
Figure 4:
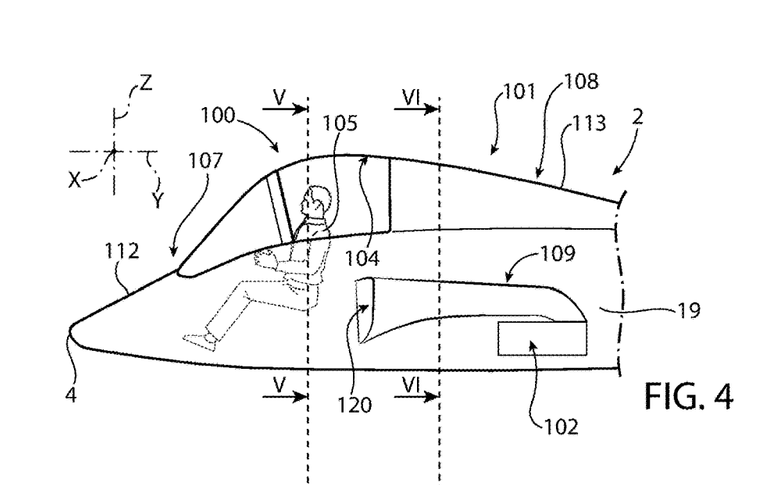
FIG. 4 shows the fuselage of the aircraft of FIG. 1 in a side view, with parts removed for clarity's sake.

In particular, the root 17 and end 18 portions are inclined to each other (FIG. 3).

In the case shown, the wingspan of the half-wings 3 is greater than the wingspan of the aerodynamic surfaces 8.

The wingspan of the aerodynamic surfaces 9 is greater than the wingspan of the aerodynamic surfaces 8.

In this description, the term "wingspan" means the distance between opposite free ends 15, of the respective half-wings 3 and of the aerodynamic surfaces 9, 8.

The aerodynamic surfaces 9 are arranged below the half-wings 3 (FIG. 3).

The fuselage 2 further comprises (FIGS. 4 to 7):

a pair of portions 100, 101 arranged one after the other, proceeding along the axis Y from the nose 4 towards the tail 5; and an electric power source 102 (only schematically shown in FIGS. 4, 6 and 8) arranged inside the portion 101 of the fuselage 2.

The source 102 could comprise a plurality of electric batteries, a plurality of fuel cells, or an electric generator.

The portion 100 defines a housing 104 for a first crew member 105.

The portions 100, 101 respectively define a first and a second section 110, 111 (FIGS. 5, 6 and 11) in a plane orthogonal to the axis Y.

The portion 101 further comprises a pair of air intakes 120 that are open towards the outside of the fuselage 2, oriented towards the nose 4, and fluidically connected with the source 102 so as to convey, in use, a flow of cooling air onto the source 102 itself, following the forward motion of aircraft 1;

the section 111 has a larger area than the section 110;

the air intakes 120 are arranged externally to said portion 100 and on respective mutually opposite sidewalls 19 of the portion 100, in a view of the aircraft 1 according to a direction parallel to the axis Y.

The fuselage 2 houses a conveying duct 109 (FIG. 4) adapted to convey fresh cooling air onto the source 102 and fluidically connected with the air intakes 120.

Figure 6:
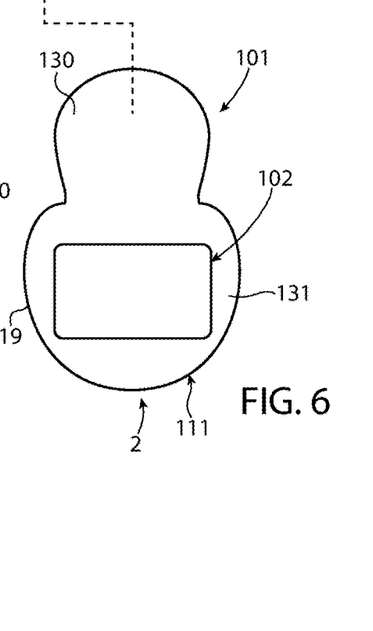
Figure 7:
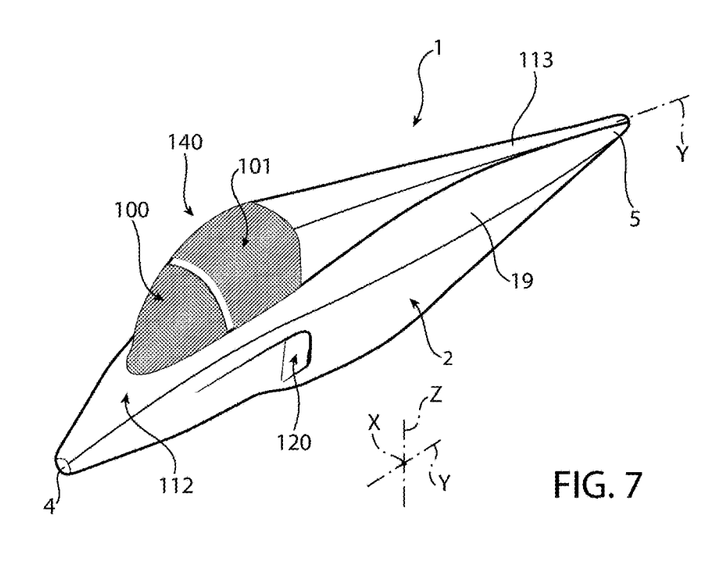
FIG. 7 is a perspective view of the fuselage of the aircraft of FIG. 1.

The section 111 is symmetrical with respect to the axes Z, Y and comprises, in turn (FIG. 6):

an area 130; and an area 131 with greater extension than the area 130, housing the source 102 and defining said air intakes 120.

The area 131 is arranged below the area 130 with respect to the axis Z, with reference to the normal forward position of the aircraft 1.

The area 131 projects laterally from both sides of the area 130, with reference to the axis X.

The fuselage 2 further comprises a transparent dome 140 adapted to cover the housing 104 for the first crew member 105.

The dome 140 is carried by the portion 100.

The dome 140 can slide or be opened laterally or towards the tail 5, in the case shown.

Figure 5:
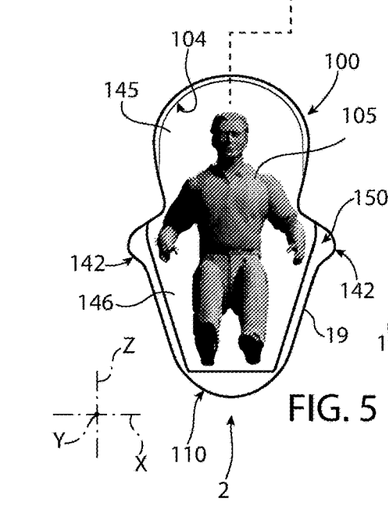
FIGS. 5 and 6 are cross-sections along the lines V-V and VI-VI of the fuselage of FIG. 4.

The section 110 is also symmetrical with respect to the axes Y, Z and comprises, in turn (FIG. 5):

an area 145 arranged at the area 130 along the axis Y; and an area 146 arranged at the area 131 along the axis Y and arranged below the area 145 with respect to the axis Z, with reference to the normal forward position of the aircraft 1.

The area 145 is contained in the area 130 and the area 146 is contained in the area 131, in a view of the aircraft 1 parallel to the axis Y.

The section 110 further comprises an area 150 interposed between the areas 145, 146 along the axis Z.

The area 145 is shaped to accommodate the head of the first crew member 105 and the area 146 is shaped to support the legs of the aforesaid first crew member 105.

The area 150 projects from both sides of the areas 145, 146, with reference to the axis X, so as to define two lateral fairings 142 adapted to accommodate respective arms of the first crew member 105.

In this way, the section 100 defines a safety cell for the first crew member 105.

Figure 1:
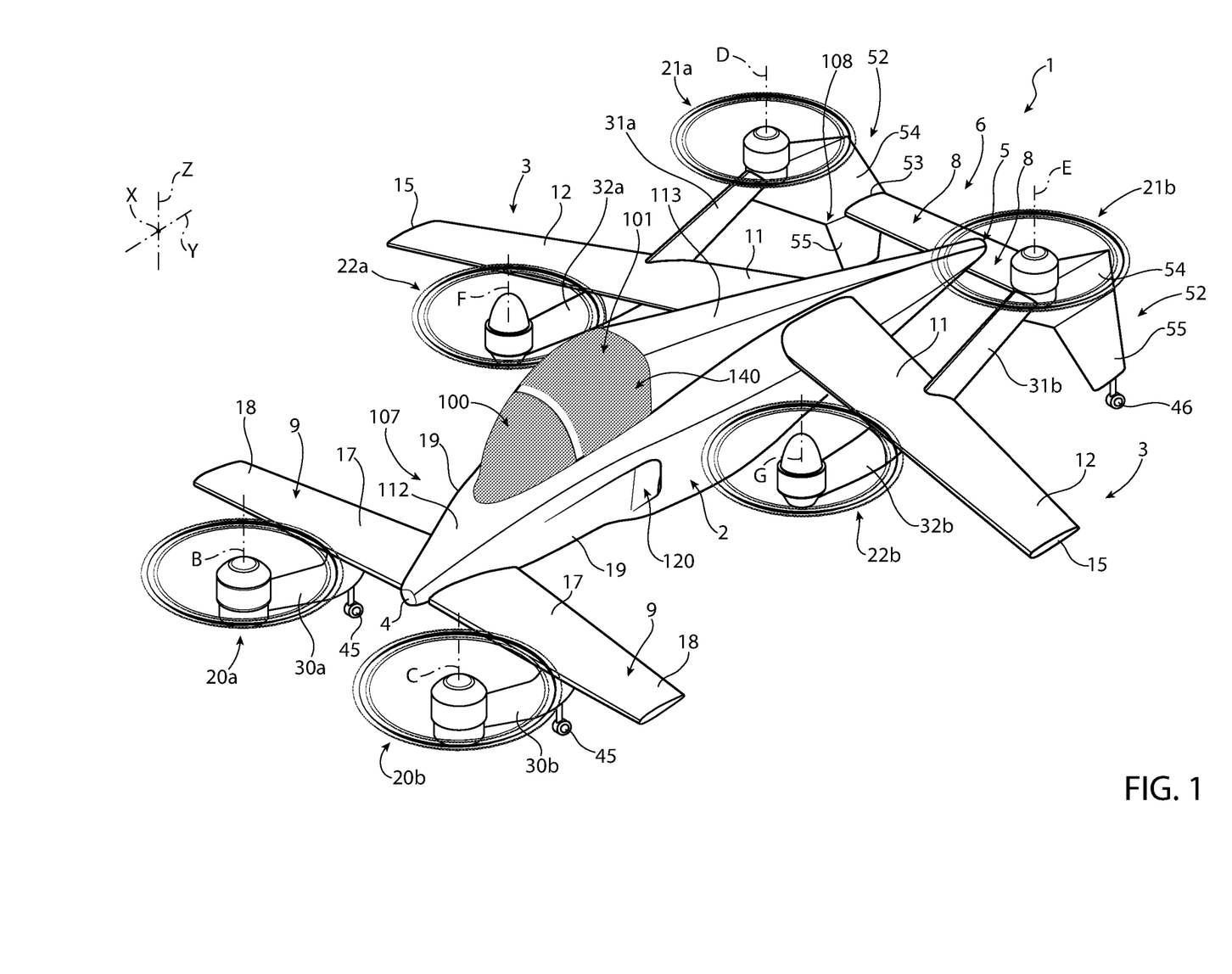
FIG. 1 is a perspective view from above and according to a first angle of view of a fuselage for a convertible aircraft, realized according to a first embodiment of the present invention.

The aircraft 1 further comprises (FIG. 1):

a portion 107 interposed between the nose 4 and the portion 100 along the axis Y; and a portion 108 interposed between the portion 101 and the tail 5 along the axis Y.

The half-wings 3 are fixed to the portion 108.

The portions 107, 108 are delimited above by respective stretches 112, 113.

The stretch 112 extends between the dome 140 and the nose 4 along the axis Y. The stretch 112 is inclined with respect to the axis Y and extends below the dome 140 at progressively increasing distances from the dome 140 proceeding towards the nose 4 and measured along the axis Z.

The stretch 113 extends between the portion 101 and the tail 5 along the axis Y. The stretch 113 is inclined with respect to the axis Y and extends below the portion 101 at progressively increasing distances from the dome 140 proceeding towards the tail 5 and measured along the axis Z.

The portions 100, 101 are joined together parallel to the axis Y.

Figure 2:
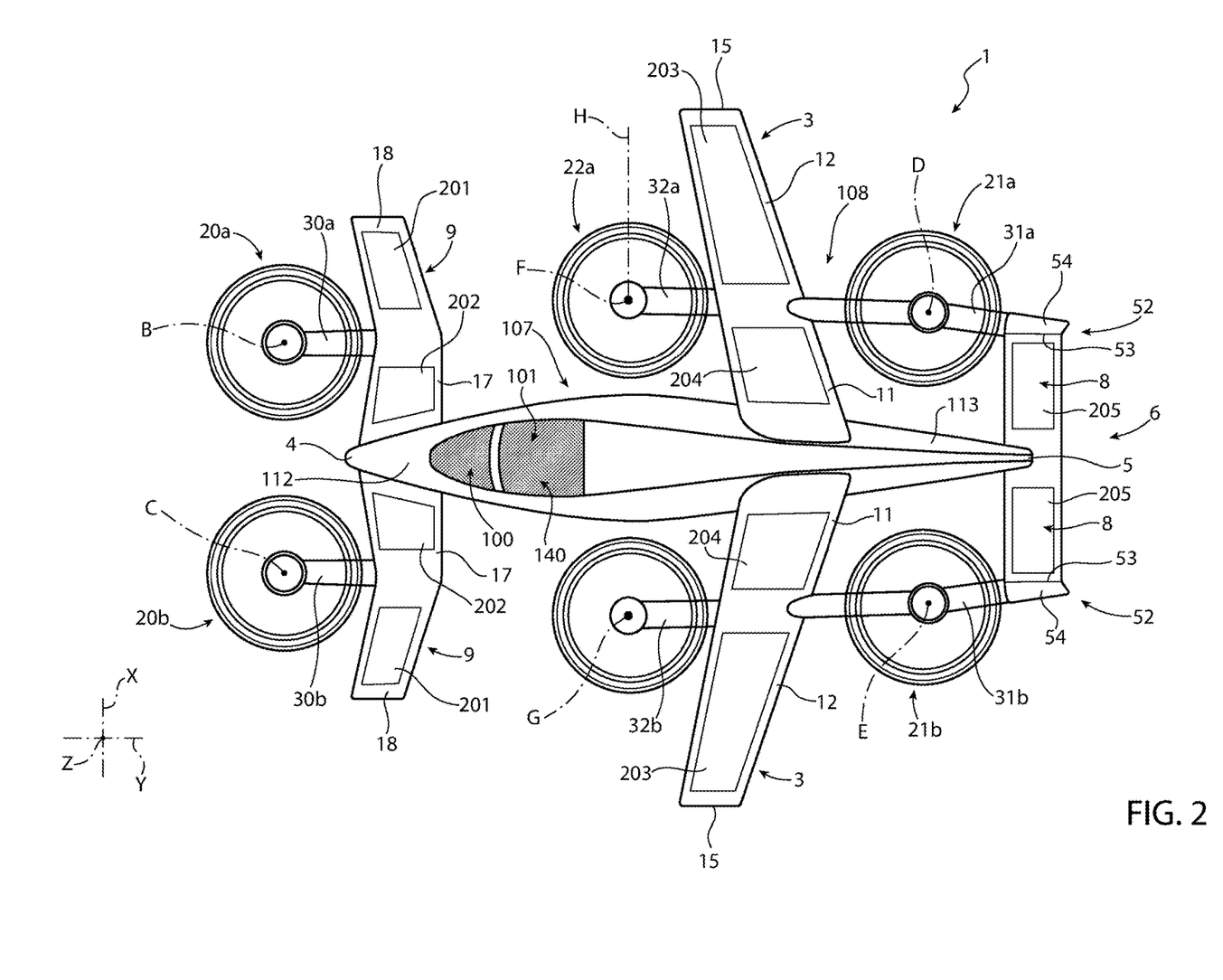
FIG. 2 shows the aircraft of FIG. 1 in a top view.

The aerodynamic surfaces 9 comprise respective foam carried the inserts 201, 202 respectively by corresponding root 17 and end 18 portions (FIG. 2).

The half-wings 3 comprise respective foam inserts 203, 204 carried respectively by the corresponding root 11 and end 12 portions.

The aerodynamic surface 8 comprises a cup of foam inserts 205 arranged symmetrically with respect to the axis Y.

The inserts 201, 202; 203, 204; 205 confer structural strength to the aerodynamic surfaces 9, to the half-wings 3 and to the aerodynamic surfaces 8, and confer buoyancy capacity to the aircraft 1.

Figure 8:
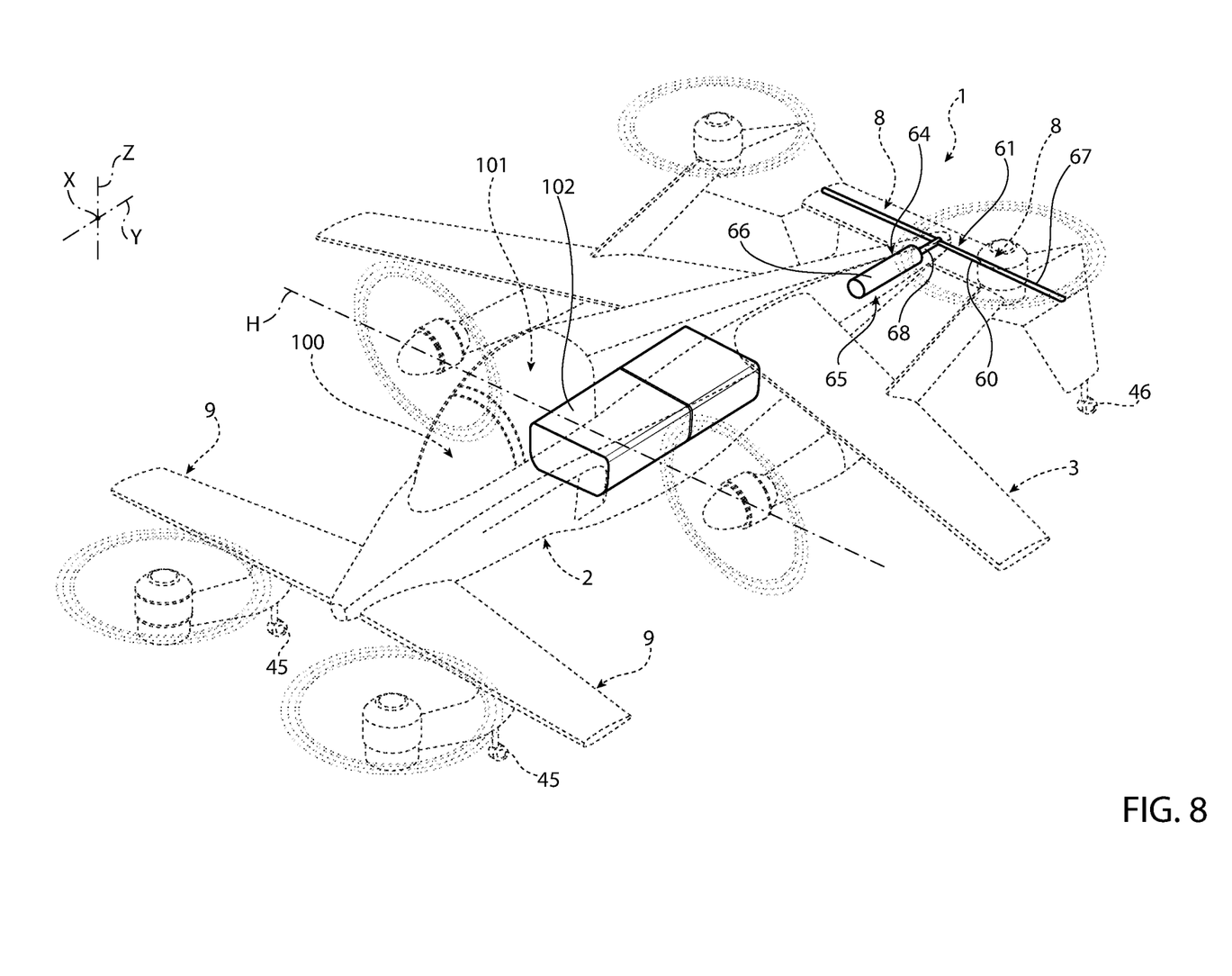
FIG. 8 is a perspective view of the aircraft of FIGS. 1 to 7, with first components in transparency for clarity's sake.
Figure 9:
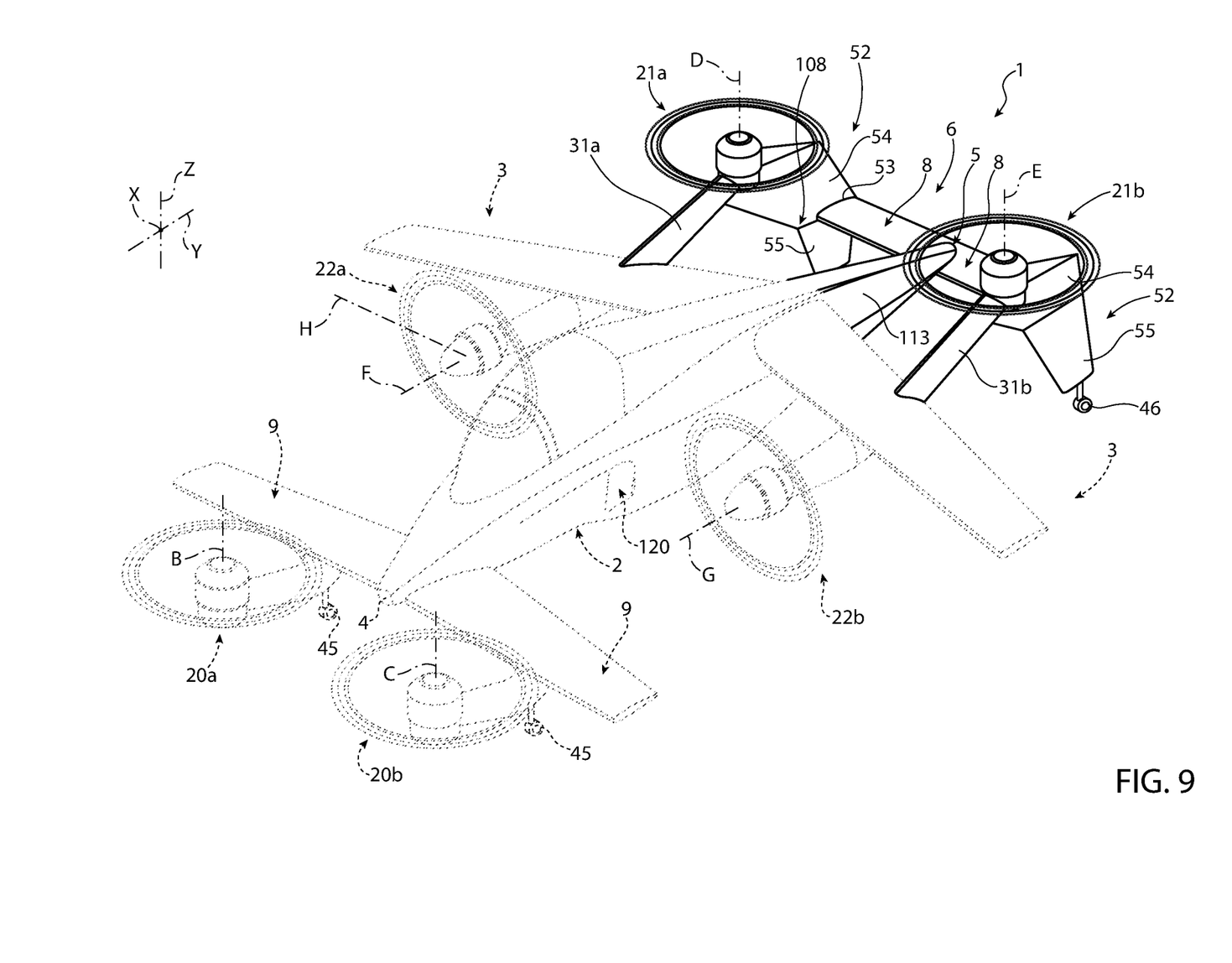
FIG. 9 is a perspective view of the aircraft of FIGS. 1 to 7, with second components in transparency for clarity's sake.
Figure 10:
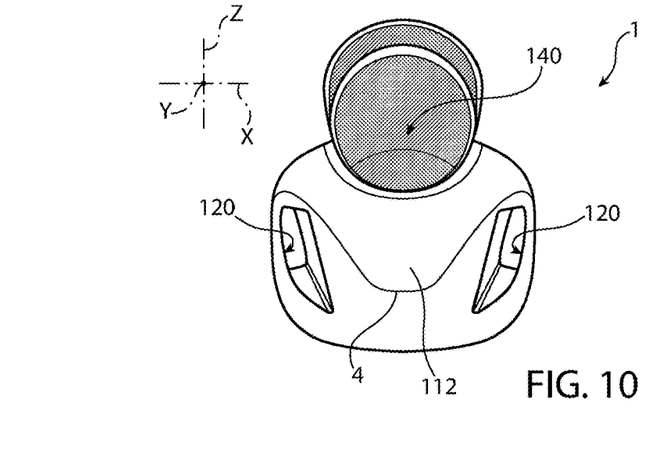
FIGS. 10 and 11 are front views of the fuselage of the aircraft of FIGS. 1 to 9, respectively with third and fourth components not shown for clarity's sake.
Figure 11:
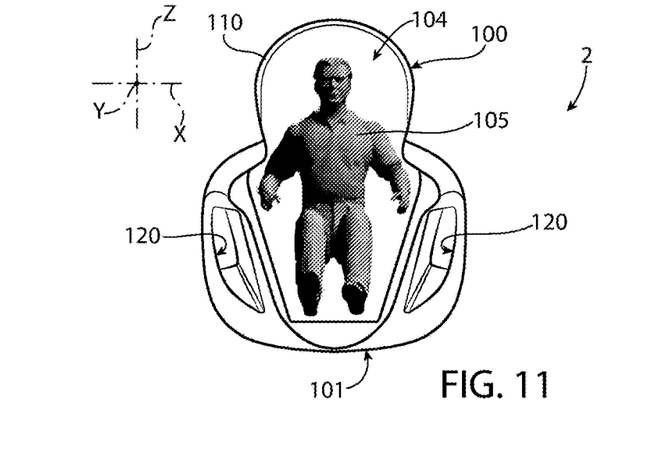

The aircraft 1 further comprises (FIGS. 1 to 3):
- a pair of rotors 20a, 20b which are rotatable around respective fixed axes B, C with respect to the fuselage 2;
- a pair of rotors 21a, 21b which are rotatable around respective fixed axes D, E with respect to the fuselage 2; and
- a pair of rotors 22a, 22b which are rotatable around respective axes F, G and inclinable with respect to an axis H (indicated only in FIG. 2) between a first position that is assumed when the aircraft 1 is in the first configuration (FIGS. 1 to 3) and a second position that is assumed when the aircraft 1 is in the second configuration (FIGS. 8 and 9).

In the shown case, the axes F, G of the rotors 22a, 22b are inclinable with respect to the axis H by more or less fifteen degrees towards the nose 4 or the tail 5 with respect to the axis Z.

The aircraft 1 further comprises:
- a plurality of electric powertrains 40a, 40b, 40c, 40d, 40e, 40f (only schematically shown in FIG. 12) adapted to be electrically powered wholly or partly by the source 102 and to drag into rotation respective rotors 20a, 20b, 21a, 21b, 22a, 22b; and
- a control unit 71 (only schematically shown in FIG. 12) receiving as input a plurality of control signals provided by the crew or by an autopilot or a remote control system, and programmed to provide as output a plurality of commands to command the electric powertrains 40a, 40b, 40c, 40d, 40e, 40f so that the respective rotors 20a, 20b; 21a, 21b; 22a, 22b provide desired values of the relative thrusts.

Figure 12:
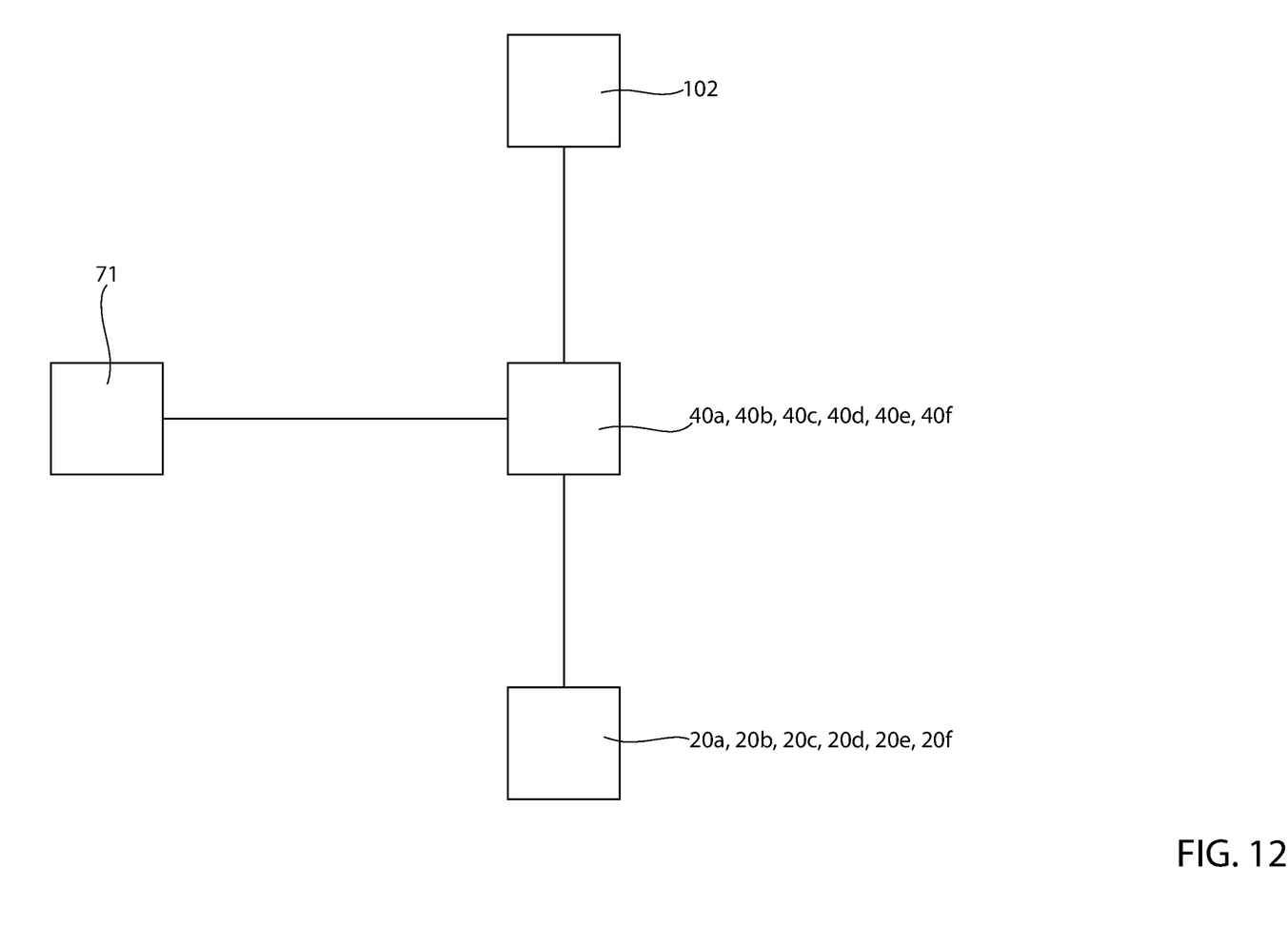
FIG. 12 is a functional diagram of some components of the aircraft of FIGS. 1 to 11.

In greater detail, the control unit 71 is programmed to command the rotors 20a, 20b; 21a, 21b; 22a, 22b to generate respective mutually independent thrusts.

More particularly, the control unit 71 is programmed to command the rotors 20a, 20b; 21a, 21b; to generate respective thrusts having a resultant which is parallel to the axis Z, both when the aircraft 1 is in the first configuration and when the aircraft 1 is in the second configuration.

The control unit 71 is programmed to command the rotors 20a, 20b; 21a, 21b to generate respective zero thrusts under predetermined operating conditions and when the aircraft 1 is in the first configuration.

The axes B, C; D, E and F, G are arranged symmetrically to the axis Y.

In the case shown, the axes B, C, D and E are parallel to each other and parallel to the axis Z.

The axes B, D, F; C, E, G are aligned with each other orthogonally to the axis Y when the aircraft 1 is arranged in the first configuration.

The axes F, G are arranged parallel to the axis Z when the rotors 22a, 22b are arranged in the first position.

The axes F, G are arranged orthogonally to the axes B, C; D, E and parallel to the axis Y when the rotors 22a, 22b are arranged in the second position.

In one embodiment, the rotors 20a, 20b; 21a, 21b; 22a, 22b are with fixed pitch.

The aircraft 1 further comprises (FIG. 2):
- a pair of supports 30a, 30b in order to support respective rotors 20a, 20b in a fixed manner with respect to respective aerodynamic surfaces 9;
- a pair of supports 31a, 31b in order to support respective rotors 21a, 21b in a fixed manner with respect to respective half-wings 3 and to the tail portion 6; and
- a pair of supports 32a, 32b in order to support respective rotors 22a, 22b to respective half-wings 3 in an inclinable manner with respect to the axis H.

Preferably, the supports 32a, 32b are spaced apart from the ends 15 of the respective half-wings 3, with reference to an extension direction of the same half-wings 3.

The supports 30a, 30b are spaced apart from the free ends of the respective aerodynamic surfaces 9, with reference to an extension direction of the same aerodynamic surfaces 9.

In particular, the supports 30a, 30b are conformed as respective plates projecting cantilevered below from respective aerodynamic surfaces 9 in front of the nose 4 and lying on respective planes orthogonal to the direction Y and arranged vertically in the normal position of the aircraft 1 (FIG. 1).

The axes B, C are arranged in front of the nose 4.

The axes D, E are arranged in front of the respective aerodynamic surfaces 8.

The rotors 22a, 22b are interposed between the respective half-wings 3 and the nose 4 along the axis Y both when the aircraft 1 is arranged in the first configuration and when the aircraft 1 is arranged in the second configuration.

The rotors 22a, 22b are arranged above the respective half-wings 3 when the aircraft 1 is arranged in the first configuration (FIGS. 1, 2 and 3), and in front of the respective half-wings 3 when the aircraft 1 is arranged in the second configuration (FIGS. 8 and 9).

With particular reference to FIG. 9, the tail portion 6 essentially comprises:
- the aerodynamic 8 extending from surface respective mutually opposite sides of the tail 5 and lying on a plane substantially orthogonal to the axis Z; and
- a pair of drifts 52 projecting cantilevered from mutually opposite ends 53 of the surface 8.

In greater detail, each rotor 52 essentially comprises:
- a portion 54 extending upwards starting from the relative end 53 with reference to the normal position of the aircraft 1 and lying on a plane inclined with respect to the axes Y, Z; and
- a portion 55 extending downwards starting from the relative end 53 with reference to the normal position of the aircraft 1, inclined with respect to the portion 54, and lying on a plane orthogonal to the axis X.

The supports 31a, 31b are conformed as rods parallel to the axis Y and extending integrally, each, between a respective half-wing 3 and the portion 55 of a respective drift 52.

The portions 54, 55 are arranged below the rotors 21*a*, 21*b*, with reference to the normal forward position of the aircraft 1.

In particular, the surface 8 comprises (FIG. 8):
a main portion 60; and
an appendage 61 (visible only in FIG. 8) movably connected to the main portion 60.

In the shown case, the appendage 61 is arranged behind the main portion 60 with reference to the normal forward position of the aircraft 1, and is hinged to the main portion 60 around an axis parallel to the axes H, X.

The aircraft 1 further comprises an actuator 65 operable to rotate the appendage 61 with respect to the main portion 60 and around the axis parallel to the axes H, X.

The actuator 65 essentially comprises (FIG. 8):
a fixed body 66 housed in the fuselage 2 and housing a servomotor 64;
a rod 67 elongated parallel to the axes H, X and fixed to the appendage 61; and
a rod 68 slidable with respect to the fixed body 66 parallel to the direction Y following actuation of the servomotor 64 and hinged, on the opposite side of the fixed body 66, to the rod 67 around the axis parallel to the axes H, X.

The aircraft 1 further comprises (FIGS. 1 and 8):
a pair of carriages 45 carried by respective aerodynamic surfaces 9; and
a pair of carriages 46 carried by respective portions 55 from the drift 52 on the side opposite the surface 8.

The carriages 45, 46 are flexibly mounted with respect to the aerodynamic surfaces 9 and to the portions 55, respectively.

The following describes the operation of the aircraft 1, with reference to a use in a sports competition and/or in a personal/urban air vehicle (PAV) environment.

The first crew member 105 accesses the portion 100 through the sliding or laterally openable dome 140.

Next, the first crew member 105 is accommodated in the portion 100 of the fuselage 2.

The source 102 powers, in whole or in part the powertrains 40*a*, 40*b*, 40*c*, 40*d*, 40*e*, 40*f* with electrical power.

The air intakes 120 convey fresh air into the duct 109, which continuously cools the source 102.

The control unit 71 receives as input a plurality of control signals provided by the crew, by an autopilot or a remote control system, provides as output a plurality of commands to command the electric powertrains 40*a*, 40*b*, 40*c*, 40*d*, 40*e*, 40*f* independently of each other so that the respective rotors 20*a*, 20*b*; 21*a*, 21*b*; 22*a*, 22*b* provide desired values of the relative thrusts.

The aircraft 1 lands and takes off arranged in the first configuration with the rotors 22*a*, 22*b* arranged in the first position wherein the relative thrusts are directed parallel to the axis Z (FIGS. 1, 2 and 3).

The aircraft 1 moves forward cruising in the second configuration with the rotors 22*a*, 22*b* arranged in the second position wherein the respective thrusts are arranged parallel to the axis Y (FIGS. 8 and 9).

In the first configuration, the lift required to sustain the aircraft 1 is provided by the rotors 20*a*, 20*b*; 21*a*, 21*b* and 22*a*, 22*b*.

In the second configuration, the lift required to sustain the aircraft 1 is mostly provided by the half-wings 3. The rotors 20*a*, 20*b*; 21*a*, 21*b* can be deactivated, if necessary.

The control and the manoeuvrability of the aircraft around the axes X, Y, Z is obtained by appropriately acting on the values of the thrusts generated by the rotors 20*a*, 20*b*; 21*a*, 21*b*; 22*a*, 22*b* and/or on the relative inclination of the rotors 22*a*, 22*b* with respect to the axis H.

With reference to the second configuration, the variation of the angle of inclination of the appendage 61 through the actuator 65 contributes to controlling and manoeuvring the aircraft 1 with respect to the axis X.

Figure 13:
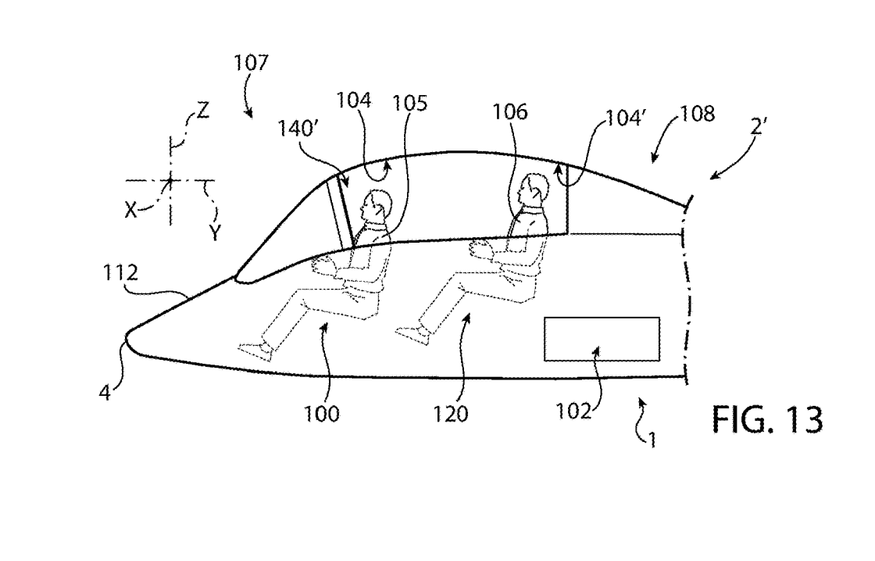
FIG. 13 is a side view of a fuselage realized according to a second embodiment of the invention, with parts removed for clarity's sake.

With reference to FIG. 13, 2' denotes a fuselage according to a second embodiment of the present invention.

The fuselage 2' is similar to the fuselage 2 and will be described below only in so far as it differs from the latter; equal or equivalent parts of the fuselages 2, 2' will be marked, where possible, with the same reference numbers.

In particular, the fuselage 2' differs from the fuselage 2 in that the portion 101 defines a housing 104' for a second crew member 106 arranged behind the housing 104 along the axis Y. In particular, the housing 104' allows the second member 106 to sit astride at least a front portion of the source 102.

The dome 140' also extends beyond the portion 101 towards the tail 5 so as to be arranged above the housing 104'.

The operation of the fuselage 2' is completely similar to that of the fuselage 2 and is therefore not described in detail.

Figure 14:
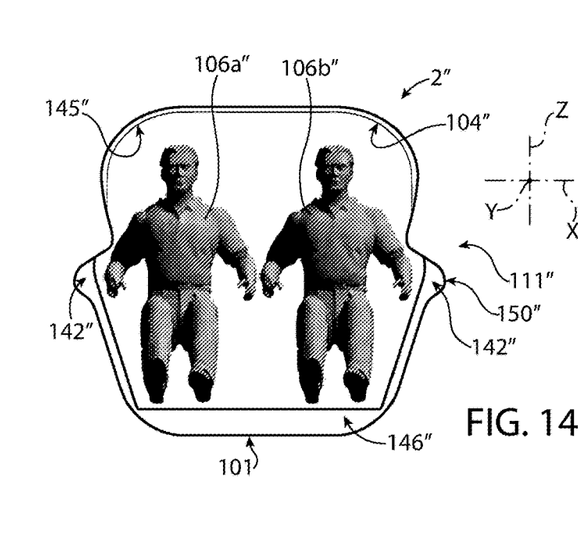
FIG. 14 is a cross-section of a fuselage realized according to a third embodiment of the invention, with parts removed for clarity's sake.

With reference to FIG. 14, 2" denotes a fuselage according to a third embodiment of the present invention.

The fuselage 2" is similar to the fuselage 2 and will be described below only in so far as it differs from the latter; equal or equivalent parts of the fuselages 2, 2" will be marked, where possible, with the same reference numbers.

In particular, the fuselage 2" differs from the fuselage 2 in that the portion 101 defines a housing 104" for a second and a third crew member 106*a*", 106*b*" side by side along the axis X.

The section 111" is conformed similarly to the section 111 of the fuselage 2 but has increased overall dimensions in order to accommodate the two crew members.

In a nutshell, the section 111" comprises:
an area 145"; and
an area 146" arranged below the area 146", with reference to the normal forward position of the aircraft 1; and
an area 150" interposed between the areas 145, 146 along the axis Z.

The area 145" is shaped to accommodate the heads of the first and second crew members 106*a*", 106*b*" and the area 146" is shaped to support the legs of the aforesaid first and second crew member 105, 106.

The area 150" projects from both sides of the areas 145", 146", with reference to the axis X, so as to define two lateral fairings 142" adapted to accommodate the arms of the first member 105 and of the second member 106 of the crew.

The operation of the fuselage 2" is completely similar to that of the fuselage 2 and is therefore not described in detail.

From an examination of the characteristics of the fuselage 2, 2', 2" according to the present invention, the advantages that it allows obtaining are evident.

In greater detail, the section 111 of the portion 101 has a larger area than the section 110 and defines the air intakes 120 intended to convey the cooling air towards the source 102.

In other words, the fuselage 2, 2' 2" comprises the portion 100 defining the housing 104 for the first crew member 105, and the portion 101 defining the air intakes 120 and housing the source 102.

It is thus possible to use the same fuselage 2, 2', 2" both to accommodate the first member 105 and to cool the source 102.

The sections 110, 111 have optimized relative shape and dimensions with reference to their respective functions, allowing the overall drag of the fuselage 2, 2', 2" and, consequently, of the aircraft 1 to be substantially reduced.

The position and/or shaping of the air intakes 120 that are lateral to the section 111 contributes to decreasing the aerodynamic drag of the fuselage 2, 2', 2'.

This makes it possible to realize a fuselage 2, 2', 2" particularly suitable for the aircraft 1 intended for sports competitions or for use in an urban air mobility scenario.

The section 110 of the portion 100 defines a safety cell for the first crew member 105 formed by:
- the area 145 shaped to accommodate the head of the first crew member 105;
- the area 146 shaped to support the legs of the aforesaid first crew member 105; and
- the area 150 projecting from both sides of the areas 145, 146, with reference to the axis X, so as to define the lateral fairings 142 adapted to accommodate respective arms of the first crew member 105.

Similarly, the section 111" of the fuselage 2" defines a safety cell for the second and third crew member 106a", 106b".

The sections 112, 113 extend at progressively increasing distances from the dome 140, 140', measured parallel to the axis Z and proceeding towards the nose 4 and the tail 5 of the fuselage 2, 2', 2", respectively.

This arrangement combined with the conformation of the sections 110, 111, 111" makes it possible to optimize visibility from the inside of the housing 104, 104', 104" towards the outside of the aircraft 1 and to facilitate access to the housing 104, 104', 104".

The fuselage 2, 2', 2" supports and connects the half-wings 3 and the aerodynamic surfaces 8, 9, in addition to defining the housing 104, 104', 104" and reducing as much as possible the overall aerodynamic drag of the aircraft 1.

The fuselage 2, 2', 2" also houses the fixed body 66 of the actuator 65 adapted to control the position of the appendage 61 with respect to the main portion 60 of the tail plane 50, thereby greatly reducing the aerodynamic drag of the aircraft 1 with respect to the solutions of the known type.

Preferably, the half-wings 3 negative have deflection and/or negative dihedral angle.

Thus, the half-wings 3 are optimized for forward flight in the first high-speed configuration and ensure high stability to the aircraft 1 in the aforesaid first configuration.

The half-wings 3 have no movable ailerons, thus resulting in a particularly simple shape and geometry.

The foam inserts 201, 202; 203, 204; and 205 arranged in the aerodynamic surfaces 9, in the half-wings 3, and in the aerodynamic surface 8 confer structural strength buoyancy capacity to the aircraft 1.

The density of such foam inserts 201, 202; 203, 204; 205 is determined based on the construction needs and the performance requirements of the aircraft 1.

This makes aircraft 1 particularly suitable for competition scenarios or for use in sufficiently large portions of the sea, lakes or rivers.

It is clear that the fuselage 2, 2', 2" and the aircraft 1 described and shown herein may be subject to modifications and variations without thereby departing from the scope of protection defined by the claims.

In particular, the fuselage 2, 2', 2" could comprise a single air intake 120 arranged at a relative sidewall 19.

The housing 104 could accommodate two first crew members 105 arranged side by side parallel to the axis X.

The aircraft 1 could comprise instead of the rotors 22a, 22b, one or more reaction or jet engines fuelled by fossil fuel or sustainable fuels (SAF), which are fixed with respect to the fuselage 2, and configured to generate a thrust parallel to the axis Y under forward flight conditions.

The aircraft 1 may not comprise the aerodynamic surfaces 8.

The axes B, C; D, E may not be parallel to the axis Z and may be inclined with respect to the axis Z by an angle ranging between −15 and +15 degrees. In particular, the axes B, C (D, E) could converge in the axis Z above or below the fuselage 2.

Some or all of the rotors 20a, 20b, 21a, 21b, 22a, 22b may have variable pitch.

The carriages 45, 46 could be replaced by skids or additional landing gear.

Finally, the aircraft 1 may not comprise the aerodynamic surface 8. In this case, the tail portion 6 would comprise a pair of drifts projecting cantilevered downwards from the tail 5 and diverging symmetrically to the axis Y starting from the tail 5 downwards.

The invention claimed is:

1. A VTOL aircraft (1) comprising:
a fuselage (2, 2', 2"); and
a pair of half-wings (3) arranged on respective mutually opposite lateral sides of said fuselage (2, 2', 2') and generating, in use, a first lift value;
a first and a second rotor (20a, 20b) carried by respective said half-wings (3), respectively rotatable around a first and a second axis (F, G) inclinable with respect to said fuselage (2, 2', 2");
said first and second axis (F, G) being arranged on respective mutually opposite lateral sides of said fuselage (2, 2', 2") and symmetrically with respect to a third axis (Y);
said VTOL aircraft (1) being switchable between:
a first hovering or take-off/landing flight configuration wherein said first and second axis (F, G) are arranged orthogonal to said third axis (Y); and
a second forward flight configuration wherein said first and second axis (F, G) are arranged parallel to or inclined with respect to said third axis (Y);
said fuselage (2, 2', 2") comprising:
a nose (4) and a tail (5) arranged at mutually opposite sides along said third longitudinal axis (Y) of said fuselage (2, 2', 2");
a first portion (100) and a second portion (101) arranged one after the other, proceeding along said third axis (Y) from said nose (4) towards said tail (5); and
an electric power source (102) arranged inside said second portion (101);
said first and second portion (100, 101) defining a first and second section (110, 111, 111") respectively in a plane orthogonal to said third axis (Y);
said second section (111) defining at least one air intake (120) that is open towards the outside of the fuselage (2) itself and fluidically connected with said source (102) so as to convey, in use, a flow of cooling air onto the source (102) itself following the forward motion of said VTOL aircraft (1);
said second section (111, 111") having a larger area than said first section (110);
said air intake (120) being arranged at one sidewall (19) of said second portion (101);
said air intake (120) being arranged externally to said first portion (100) and in a view of said fuselage (2, 2', 2") parallel to said third axis (Y);
said first section (110) comprises, in turn:
a first area (145); and a second area (146) arranged below said first area (145), with reference to said normal forward motion position of said fuselage (2, 2', 2");

characterized in that the VTOL aircraft comprises at least one electric powertrain (40a, 40b, 40c, 40d, 40e, 40f) operatively connected with said source (102) and with at least one of said first and second rotor (20a, 20b);

said first and second rotor (20a, 20b) being operable independently of each other;

said first section (110) defining a first housing (104) for a first crew member (105); said first section (110) comprising a third area (150) interposed between said first and second area (145, 146) along a fifth axis (Z) orthogonal to said third axis (Y);

said third area (150) projecting from both sides of said first and second area (145, 146), with reference to a fourth axis (X) orthogonal to said third axis (Y) and to said fifth axis (Z), so as to define two lateral fairings (142) adapted to accommodate respective arms of said first member (105) of said crew;

said first section (110) defining a safety cell for said first crew member (105) formed by:

said first area (145) shaped to accommodate the head of said crew member (105);

said second area (146) shaped to support the legs of said crew member (105); and said third area (150);

said second section (111, 111") further comprising, in turn:

a fourth area (130) arranged at said first area (145) along said third axis (Y); and a fifth area (131) with greater extension than said fourth area (130), arranged at said second area (146) along said third axis (Y), and housing said source (102) and defining said air intake (120);

said fifth area (131) being arranged below said fourth area (130), with reference to a normal position of said VTOL aircraft (1);

said fifth area (131) projecting laterally from both sides of said fourth area (130);

said first area (145) being contained in said fourth area (130) and said second area (146) being contained in said fifth area (131), in a view of said VTOL aircraft (1) parallel to said third axis (Y).

2. The VTOL aircraft according to claim 1, wherein said second portion (101) defines a second housing (104') for a second member (106) of the crew or a third housing (104") for a second and third member (106a", 106b") of said crew that are arranged side by side, in use, along said fourth axis (X);

said second section (111) defining a pair of lateral fairings (142") interposed along said fifth axis (Z) between said fourth and fifth area (145, 146), and projecting laterally from said fourth and fifth area (145, 146) parallel to said fourth axis (X).

3. The VTOL aircraft according to claim 1, characterized in that said first and second portion (100, 101) are joined together.

4. The VTOL aircraft according to claim 1, characterized in that the VTOL aircraft comprises:

a transparent dome (140, 140') extending partially within at least one of said first and second portion (100, 101);

a first stretch (112) extending from said dome (140, 140') towards said nose (4) at progressively increasing distances from the dome (140, 140') itself measured along said fifth axis (Z); and a second stretch (113) extending from said dome (140) towards said tail (5) at progressively increasing distances from the dome (140, 140') itself measured along said fifth axis (Z).

5. The VTOL aircraft according to claim 1, characterized in that said half-wings (3) are fixed to a third portion (108) of said fuselage (2, 2', 2");

said third portion (108) being interposed between said second portion (101) and said tail (5) along said first axis (Y).

6. The VTOL aircraft according to claim 1, characterized in that said half-wings (3) have negative deflection and/or negative dihedral angle.

7. The VTOL aircraft according to claim 6, characterized in that said half-wings (3) have no respective aerodynamic surfaces movable with respect to said half-wings (3) themselves.

8. The VTOL aircraft according to claim 1, characterized in that the VTOL aircraft comprises:

a tail portion (6) extending from both sides of said tail (6);

said tail portion (6) comprises, in turn:

a second aerodynamic surface (8) adapted to provide a second lift/downforce value and projecting cantilevered from respective mutually opposite lateral sides of said tail (5) of said fuselage (2); and an appendage (61) movable with respect to said second aerodynamic surface (8);

said VTOL aircraft (1) further comprising an actuator (65) operable to move said appendage (61);

said actuator (65) comprising, in turn:

a fixed body (66) housed inside said fuselage (2); and a rod (67) operatively connected to said fixed body (66) and to said appendage (61).

9. The VTOL aircraft according to claim 5, characterized in that the VTOL aircraft comprises a pair of third aerodynamic surfaces (9) adapted to provide third lift/downforce values and projecting cantilevered from respective mutually opposite lateral sides of said nose (4) of said fuselage (2).

10. The VTOL aircraft according to claim 5, characterized in that the VTOL aircraft comprises:

a third and fourth rotor (21a, 21b) respectively rotatable around a sixth and a seventh axis (D, E) that are fixed with respect to said fuselage (2); and a fifth and sixth rotor (20a, 20b) respectively rotatable around an eighth and ninth axis (B, C) that are fixed with respect to said fuselage (2, 2', 2").

11. The VTOL aircraft according to claim 10, characterized in that said fourth and fifth axis (F, G), sixth and seventh axis (D, E), eighth and ninth axis (B, C) are arranged symmetrically with respect to said third axis (Y).

12. The VTOL aircraft according to claim 10, characterized in that said fourth, sixth and eighth axis (F, D, B) and said fifth, seventh and ninth axis (G, E, C) are aligned parallel to said third axis (Y) when said VTOL aircraft is in said first configuration.

13. The VTOL aircraft according to claim 10, characterized in that the at least one electric powertrain (40a, 40b, 40c, 40d, 40e, 40f) is further operatively connected with said source (102) and with at least one of said third, fourth, fifth and sixth rotor (21a, 21b, 22a, 22b);

at least one pair of said third, fourth, fifth and sixth rotor (21a, 21b, 22a, 22b) being operable independently of each other.

14. The VTOL aircraft according to claim 9, characterized in that at least one of said half-wings (3), second aerodynamic surface (8) said third aerodynamic surfaces (9) comprise a foam insert at respective end zones of the fuselage (2).

\* \* \* \* \*